United States Patent Office 2,918,777
Patented Dec. 29, 1959

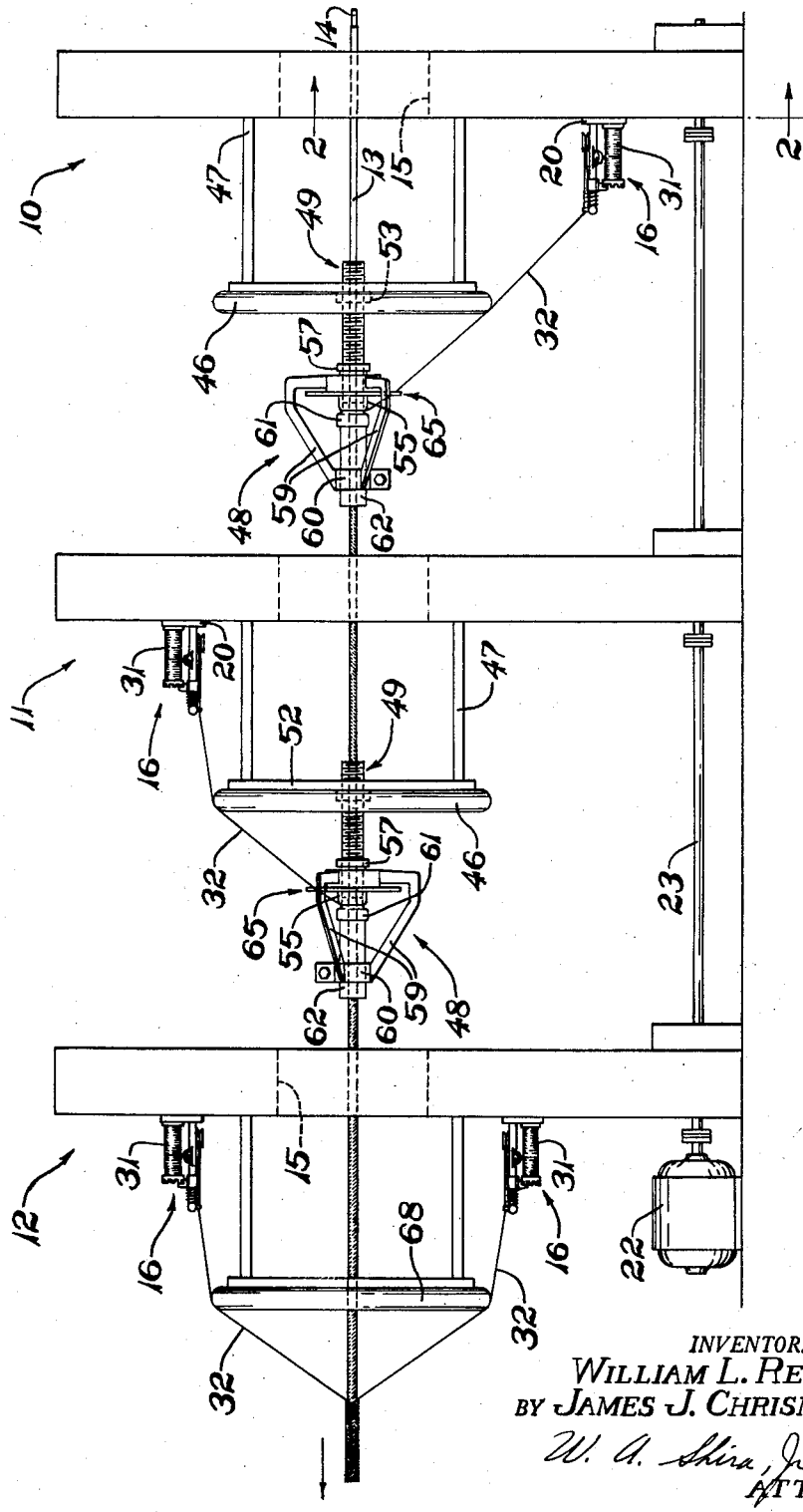

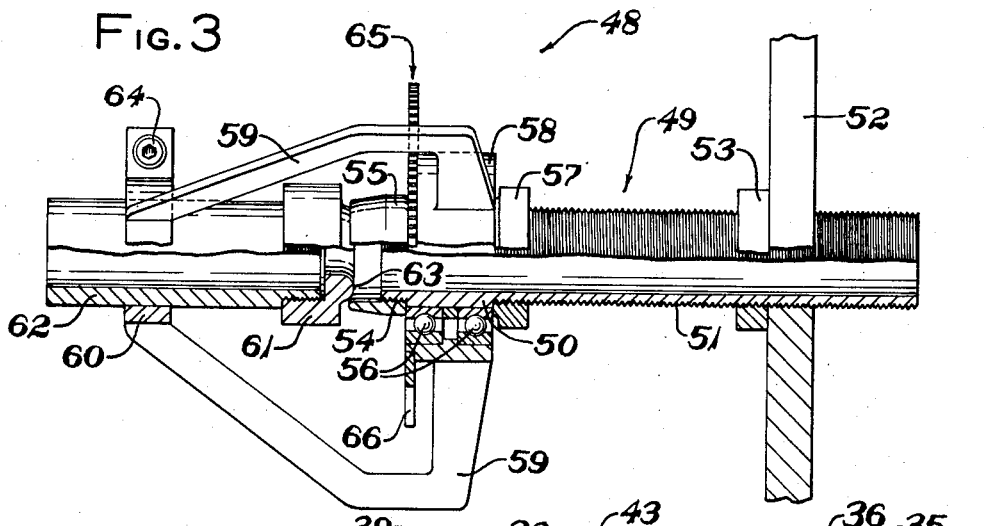
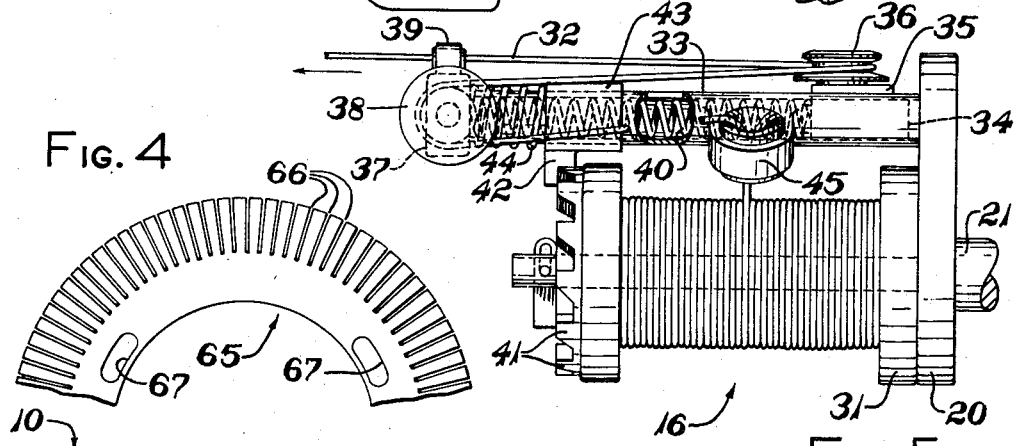
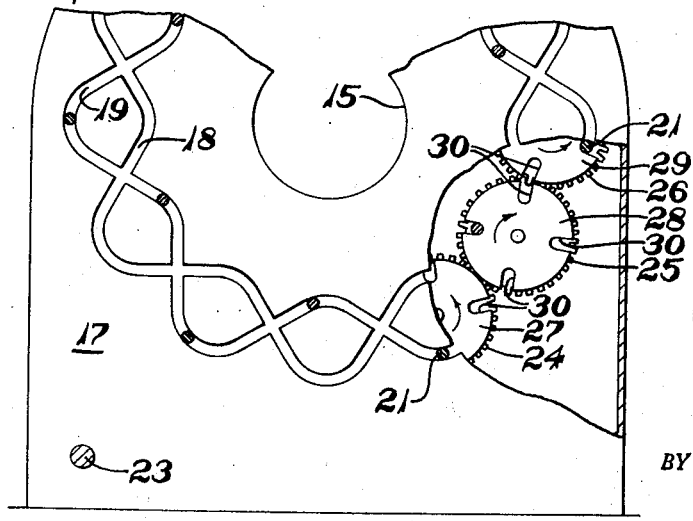

2,918,777

HOSE MAKING APPARATUS

William L. Reeve and James J. Chrisman, Akron, Ohio, assignors to The B. F. Goodrich Company, New York, N.Y., a corporation of New York Application November 12, 1958, Serial No. 773,485

18 Claims. (Cl. 57—15)

This invention relates to the art of providing cord or filamentary reinforcements about a tubular article and, more particularly, to a machine for manufacturing hose wherein filaments or cords of wire or other material are wound and/or braided about a mandrel-supported liner to provide a tubular reinforcement for the hose.

Flexible hose capable of withstanding high pressure normally comprises an impervious tubular liner and one or more stress-resistant layers formed of filaments, cords or tapes of wire or textile materials. A suitable cover may be provided or one of the stress-resistant layers may also serve as the cover. One conventional method of providing a stress-resistant layer is by braiding the reinforcing elements about the liner while it is supported on a longitudinally moving mandrel. Braided reinforcements, however, have the disadvantage that the crossovers of the elements therein result in localized bending strains and sawing action which frequently result in breakage of the elements especially when the hose is used under fluctuating pressure. Providing the reinforcing elements as helical windings eliminates the crossovers of the braided construction and results in greatly increased hose life. Similar considerations make it desirable to provide helically wound reinforcements for other tubular articles which resemble hose.

Helical windings for hose and similar tubular articles are frequently desired in multiple layers with the direction of the helix in at least some of the layers reversed relative to the direction in the other layers. In addition, it is sometimes desirable to combine one or more helically wound reinforcements with one or more braided reinforcements or covers. Heretofore, these constructions have required a plurality of separate operations with consequent loss of time and increased expense as compared to braiding operations where several layers can be provided sequentially upon the tubular article during a single pass through one machine.

An object of this invention is, therefore, to provide an improved machine for winding a plurality of helical reinforcements on a tubular article during a single pass through the machine.

Another object of the invention is the provision of a machine capable of sequentially winding one or more helical reinforcements and providing one or more braided reinforcements on a tubular article during a single pass of the article through the machine.

A further object of the invention is to provide an attachment for a braiding machine which can be easily installed therein and which will enable the machine to provide a helical winding rather than a braiding operation.

A still further object of the invention is to provide an improved machine for helically winding wire reinforcements on a tubular article with the wire bent just prior to the winding and supplied to the tubular article in a manner providing a smooth helix with adjacent convolutions in contact with each other or uniformly spaced along the article.

Other objects and advantages of the invention will be hereinafter apparent from the description of the presently preferred embodiment of the invention described with reference to the accompanying drawings, forming a part of this application, in which:

Fig. 1 is a fragmentary side elevational view of a combined helical winding and braiding machine embodying the invention, the majority of the reinforcing element supply spools being removed for the sake of clarity;

Fig. 2 is a fragmentary front elevational view of one of the reinforcing element supply spool supporting and moving units of the machine with a portion of the face of the unit being broken away to show the spool moving mechanism, the view being taken substantially as indicated by the arrows 2—2 in Fig. 1;

Fig. 3 is an enlarged view of one of the winding attachments of this invention, the view being partly in top elevation and partly in longitudinal section;

Fig. 4 is a detached fragmentary front elevational view of one of the guide members for the reinforcing elements employed with the winding attachment; and Fig. 5 is an enlarged detached side elevational view of one of the reinforcing element supply spools and associated mechanism with a part broken away to more fully show the construction.

The invention is herein illustrated and described as embodied in a conventional multiple head, or station, braiding machine of the type adapted to braid reinforcing elements, such as wire or textile cords, upon a mandrel-supported tubular article as the latter is moved longitudinally through the machine. A machine of this type is somewhat schematically shown in Fig. 1 as comprising three heads or stations 10, 11 and 12 with the head or station 12 provided with the usual mechanism for effecting a braiding operation while the stations 10 and 11 have been modified to each perform a helical winding operation with the winding at the station or head 10 being in the reverse direction to that effected at the station or head 11. In the drawings and subsequent description only so much of the conventional braiding machine mechanism is shown and specifically described as is necessary to an understanding of the invention. The omitted parts and mechanisms are conventional and will be readily understood by those skilled in the art. Also, to facilitate the disclosure, the machine is shown and described as comprising three stations or heads. A greater or lesser number of heads or stations can be provided to produce the desired number and types of layers of reinforcing elements, additional braiding heads or stations being the same as that indicated at 12 and additional helical winding stations being the same as those indicated at 10 and 11.

The tubular article 13, for example a hose liner, which is to be provided with layers of reinforcing elements, is supported, if necessary, by an elongated mandrel 14 inserted in the article. The article and the mandrel, if employed, are moved longitudinally through the machine by conventional mechanism, not shown, the direction of movement being to the left as seen in Fig. 1 progressively through the stations or heads 10, 11 and 12 each of which is provided with a central opening 15, see Fig. 2, for this purpose. Each station or head 10, 11 and 12 is normally provided with a plurality of reinforcing element-supporting spool mechanisms 16 for supplying a plurality of wires or cords simultaneously to the tubular article 13 as it moves therepast. The several spool mechanisms 16 are all identical and hence only one is shown at each of the helical winding stations or heads 10 and 11 while two are shown in the braiding station or head 12.

The spool mechanisms 16 are adapted to be moved in a generally circular path about the article 13 by mechanism of the type well known in the braiding art. As indicated in Fig. 2, the face 17 of the housing for a braiding or winding station such as 10 is provided with a pair of slotted openings 18 and 19 each of which is of sinuous configuration intersecting at the nodes in the manner of sine and cosine curves. The spool mechanisms 16 each comprise a base portion 20, see Fig. 5, having a stud 21 projecting from the inner face of the base portion and adapted to ride smoothly within the slotted openings 18 and 19 of the head. The stud 21 of each spool mechanism is retained against axial displacement from the slotted openings 18 and 19 by suitable means, not shown, and the inner end portion of the stud is positioned for engagement and actuation by the mechanism contained within the head or station, such as 10, for effecting movement of the spool mechanism through one of the paths provided by the said slotted openings 18 and 19.

The power for moving the spool mechanisms is provided by a suitable prime mover, such as a motor 22, having an elongated drive shaft 23 extending through each of the heads or stations 10, 11 and 12. Within each station or head such as 10 the shaft 23 is provided with a gear, not shown, operating through a gear train to drive a plurality of spur gears, such as 24, 25 and 26, which are disposed in meshing relationship in a circular configuration inwardly of the slotted openings 18 and 19 of the housing. The shafts of the several spur gears are each provided with stud engaging and moving members, such as 27, 28 and 29, each of which is here shown as a circular disc provided with a plurality of equally spaced radially extending slots such as 30.

The construction is such that, when the motor 22 is energized, the circular train of gears comprising gears 24, 25 and 26 are rotated in reverse directions as indicated by the arrows in Fig. 2, thus moving the stud actuating members 27, 28 and 29 in the corresponding directions. The studs 21 if the spool mechanisms are sequentially engaged by the slots 30 of the members 27, 28 and 29 thereby moving the studs and attached spools through the aforementioned generally circular paths. The rate of motion is such that, as the stud is carried in a slot of one of the moving members as, for example 28, the stud tends to be tangentially thrown from the slot. Hence, when a like slot in the adjacent member, such as 29, comes opposite the slot carrying the stud 21, the latter is thrown from the member 28 into the slot of member 29 and is carried by it to the next succeeding member and is in this manner sequentially moved through the circular path about the head or station.

When a braiding operation is to be effected, spool mechanisms 16 are provided for each of the sinuous slots 18 and 19, the carriers being initially positioned such that they move in spaced relationship within their respective groove or slot for alternately crossing over the other groove or slot without interference with the spool carriers moving therein. The single set of gears and spool moving members serves to effect the movements of the two sets of spools in reverse directions as will be readily understood from an inspection of Fig. 2 coupled with the known operation of braiding machines. The result is such that the reinforcing elements, such as wires, carried by the spool mechanisms 16 are delivered therefrom in a manner such that they are braided in a tubular fashion about the article moving through the machine. When it is desired to convert a braiding head or station to a helical winding operation, alternate spool mechanisms 16 are removed from that head or station leaving only those which are actuated to move in a single direction. The driving mechanism need not be altered in any respect.

Each of the illustrated spool mechanisms 16 includes a spool 31 for wire or other reinforcing elements 32 rotatably mounted on the face of the base portion 20 on the side thereof opposite the stud 21. Adjacent the spool 31 the base portion 20 is provided with a hollow tube 33 extending parallel to the spool and in this tube is slidable a member 34. The member 34 has a portion 35 extending through a slot 33a in the side of the tube, which portion is provided with a guide pulley 36. The top of the tube 33 is closed by a member 37 which rotatably supports a guide pulley 38. The member 37 also has a projecting portion 39 formed with an opening constituting a guide eyelet for the wire or other reinforcing element. Within the tube 33, between the stationary top member 37 and the sliding member 34 is a compression spring 40 which acts upon the member 34 to move the latter in the direction of the base 20. The outer end of the spool 31 is provided with ratchet teeth 41 with which a pawl member 42 is normally engaged. The pawl member 42 is integral with a collar 43 slidable on the exterior of the tube 33 and guided for straight line axial movement by a projection, not shown, extending into the slot 33a of the tube. A compression spring 44 on the exterior of the tube 33, between the member 37 and collar 43, normally retains the pawl 42 in engagement with the ratchet teeth 41.

The exterior of the tube 33 is also provided with an eyelet 45 through which wire 32 or other reinforcing element is led. From the eyelet 45 the wire 32 passes over pulley 38 then back through pulley 36 and from the latter through the eyelet 39 to the location of the winding or braiding operation. The construction is such that, as wire 32 is used in the winding or braiding operation, the resulting tension in the wire causes the member 34 to move outwardly in the tube 33 against the force of the spring 40 until the portion 35 of member 34 engages collar 43 and moves it axially sufficiently to disengage the pawl 42 from the teeth 41. The spool 31 then rotates under the impetus of the tension of the wire 32 supplying wire until the tension therein is reduced sufficiently for the springs 40 and 44 to move the members 34 and 43 in the direction which results in re-engagement of the pawl 42 with the ratchet teeth 41. This action is continuously repeated as the tension in the wire increases and decreases during the braiding or winding operations.

As heretofore mentioned, the illustrated machine is basically a conventional multi-station or multi-head braiding machine, the heads or stations 10 and 11 of which have been modified to provide a helical winding rather than a braiding operation. One part of this modification consists in the aforementioned removal from the head or station 10 alternate spool mechanisms 16 so that the remaining ones all travel in the same direction. This, it will be remembered, requires no change in the drive for moving the spools mechanisms. The usual annular braiding ring 46, which is supported upon and spaced from the forward face of the housing for head or station 10 concentrically of the opening 15 by members 47, is retained and on this braiding ring is mounted the helical winding attachment 48.

The helical winding attachment 48 is illustrated in detail in Fig. 3 as comprising an elongated tubular member 49 having an annular cylindrical portion 50 adjacent one end with the exterior of the member threaded on either side of the cylindrical portion 50. The longer threaded portion 51 of the tubular member 49 may be considered the rear of the member and is employed for adjustably supporting the member coaxially of the opening 15 in the adjacent head or station 10. This is effected by screwing the portion 51 of tubular member 49 through a threaded opening in a suitable bar or rod 52 which extends diametrically across braiding ring 46 and is attached thereto by suitable fastening means, not shown. The position of the tubular member 49 relative to the supporting bar 52, and hence relative to the braiding ring 46, may be adjusted by threading the portion 51 a greater or lesser extent through the bar 52, the member being held in its adjusted position by a lock nut or threaded collar 53. The forward threaded portion 54 of the member 49 has an annular nose or casting member 55 threaded thereon.

The exterior surface of the cylindrical portion 50 of member 49 supports anti-friction bearings 56 which are retained from axial movement by engagement with the rear portion of the casting member 55 and with a threaded collar or lock nut 57 which is screwed upon the threaded portion 51 of the member. The outer races of the bearings 56 rotatably support an annular member 58 provided with a plurality of spaced supporting arms 59 having portions extending radially from the annular member 58 and thence axially and radially forwardly with the ends of the supporting arms 59 connected to a split clamping ring 60 disposed coaxial with the member 49 and forwardly of the casting member 55 carried by the tubular member 49. The clamping ring 60 provides an adjustable support for an annular forming die 61. This is effected in the illustrated embodiment by providing the die 61 as an internally threaded collar which is screwed upon a correspondingly externally threaded end of a length of tube 62 with the said tube 62 received in and held by the clamping ring 60.

The annular forming die 61 has the forward face thereof provided with a surface 63 which is convex in cross section and which has a dimension such that it can extend a short distance within the central opening of the casting member or ring 55 with sufficient clearance therebetween to permit passage of wires 32 or similar reinforcing elements. Adjustment of the die 61 relative to the casting member or ring 55 is effected by sliding the tube 62 within the clamping collar 60, the die being held in its adjusted position by tightening the screw 64 of the clamping collar.

The annular support member 58 is also provided with a guide member 65 for directing the wires or other reinforcing elements to the aforementioned space between the nose or casting member or ring 55 and the forming die 61. This guide member 65, in the illustrated embodiment, is an annular disc provided with a plurality of radially extending slots 66; see Fig. 4. The guide member 65 is supported on a reduced diameter portion of the member 58 provided on the forward face of the latter with the guide member connected to the member 58 by screws or other suitable fastening means extending through spaced slotted openings 67 in the guide member and received in tapped openings of the member 58. It will be seen, therefore, that the member 65, while located between the spool mechanisms 16 and the space between the casting member 55 and annular die 61, is supported for rotation with the die 61 relative to the casting member 55.

The operation of the machine to effect a helical winding operation is initiated by leading the wire or other reinforcing elements 32 from the several spool mechanisms 16 over the braiding ring 46 and through the appropriate slots 66 of the guide member 65. The wires or the other reinforcing elements are then passed through the space between the casting ring or member 55 and the forming die 61 and forwardly through the opening in the die 61, that is to the left as seen in Fig. 3, with the said elements being on the exterior of the tubular article 13 which passes through the opening in the members 49 and die 61 from right to left as viewed in Fig. 3. When initially starting the operation, the loose ends of the wires thus positioned may be clamped to the article by suitable means, such as friction tape or the like. The motor 22 is then started in conjunction with the mechanism, not shown, that moves the article 13 longitudinally through the apparatus so that the spool mechanisms 16 are moved in a generally circular path about the member 13 as the latter moves therepast. The wire or other reinforcing elements are delivered from the spool mechanisms under tension and are deflected slightly while passing over the braiding ring 46 and are reversely curved when passing between the casting ring 55 and forming die 61.

It will be remembered that the member 49, and hence the casting ring 55, are stationary while the guide member 65 and annular die 61 are free to rotate. Therefore, these latter members are carried around the article 13 as the spool mechanisms 16 rotate thereabout through the interaction of the wires or other reinforcing elements upon the guide member 65. The circular movement of the reinforcing elements as they are fed from the spool mechanisms in conjunction with the axial movement of the article 13 results in a helical winding of the wire about the article. The winding operation is facilitated by the bending action upon the elements as they pass between the casting ring 55 and annular die 61 which are adjusted so that the elements are disposed in a substantially S configuration during passage over these members. This conditions the elements for a smooth and even lay upon the article which is further facilitated by the wiping action of the die member 61 upon the wires through its rotation. To achieve this latter action the inside diameter of the annular die 61 should be only slightly longer, i.e., 1/32 inch to 1/16 inch greater than the outside diameter of the reinforcing layer being wound. The required bending action for proper lay of the elements 32 can be achieved by adjusting the attachment as a whole relative to the braiding ring 46 by means of the threaded portion 51 and by adjustment of the annular die 61 relative to the casting ring 55 as permitted by loosening the clamping ring 60 and axially moving the supporting tube 62. The angle which the wound convolutions make with the axis of the article 13 is regulated by adjustment of the speeds of the longitudinal movement of the article and the circular movements of the spool mechanisms.

The reinforcing elements 32 supplied from the spool mechanisms 16 may be in the form of an individual cord or wire on each spool 31 or may be in the form of a plurality of untwisted strands on each spool. The latter mode of supply is preferably used for wire and provides a greater number of individual reinforcing elements than the number of spool mechanisms. The individual wires from the strands on a single spool mechanism are separately disposed about the tubular article 13 by placing one each of the wires in a separate slot 66 of the guide means 65. It is for this reason that the guide means 65 has a greater number of slots than the number of spool mechanisms normally provided in a machine of this type.

The article 13, as it progresses through station 10, is provided with a helical winding of wire the convolutions of which have a single direction; for example, a right-hand twist or helix. As the article 13 with this layer proceeds through station or head 11 it is provided with a second helical winding or layer the convolutions of which extend in the opposite or left-hand direction. The mechanism by which this layer or winding is effected is exactly the same as that described with respect to station or head 10 except that the spool mechanisms 16 which are removed in this station are the ones which were retained at station 10 and vice versa. Consequently, the spool moving mechanism operates at station 11 to move the spools thereof in a generally circular path but in the reverse direction to that effected at station 10. The operation and mechanism are otherwise the same and hence need not be described in detail.

The tubular article 13, provided with two layers of reinforcing members wound in helical configurations with the convolutions thereof extending in opposite directions, now passes through station 12 where a layer of reinforcing elements is braided thereabout. The station 12 is allowed to remain as a conventional braiding head or station and hence the spool mechanisms 16 are in sufficient number and so located that alternate ones thereof travel in reverse directions; that is, one set of spool mechanisms moves clockwise of the station or head while the other set is simultaneously moving counterclockwise. The reinforcing elements thus delivered from the spool mechanisms at station or head 12 pass over the usual braiding ring 68 and are delivered onto the outer surface of the article being reinforced in crossed over or braided manner as will be readily understood by those skilled in the art.

The operations described with respect to the illustrated machine result in the production of a tubular article provided with two helical layers of reinforcing elements disposed in opposite directions and a superposed braided layer. This is accomplished in a single pass of the tubular article through the machine. Additional layers of helical convolutions or of braiding may be provided in like manner by the addition of further stations or heads of the types heretofore illustrated and described. The sequence in which the several operations are effected can, of course, be changed so that, if desired, the braiding operation can be first effected followed by helical winding and further followed, if so desired, by an additional braiding or helical winding. Also, it is possible to eliminate braiding operations and provide only helical winding reinforcements. All of these modes of operations can be readily effected by a simple change in a braiding machine of conventional construction through placing or removing spool mechanisms and attaching or removing the winding apparatus 48. It is thus no longer necessary to provide separate machines for helical winding and braiding respectively but the one machine can be readily adapted to perform either or both operations simultaneously.

Although the invention has been described with respect to the use of the winding apparatus 48 as an attachment in an existing braiding machine, it will be apparent that it can also be employed in a machine not adapted to effect a braiding operation. In such a case, i.e., a machine built solely for helical winding, the mechanism for moving the spools in a circular path can be much simpler than that of the usual braiding machine since all that is required is a means to move the spool mechanisms in a generally circular path without the necessity for the sinuous movement employed in a braiding machine. Likewise the usual braiding ring 46 can be omitted and the winding apparatus 48 directly attached to the support for the spool mechanisms. The winding attachment or apparatus 48 will operate just as satisfactorily with such especially built winding machine as it does in an existing braiding machine.

It will also be understood that the reinforcing elements 32 employed at each of the stations or heads of the illustrated machine may all be alike or different types of reinforcing elements may be employed at some of the heads or stations. For example, wire may be employed for the winding operation while a braiding operation may be effected with textile cords, or the winding operations can be effected with such cords and the braiding operation performed with wire. Also, spool mechanisms of known type other than those illustrated and described may be employed. In view of these and other uses, adaptations and modifications of the disclosed and illustrated apparatus which will be apparent to those skilled in the art, the invention is not to be considered as limited to the specific details shown and described except as required by the appended claims.

Having thus described the invention, we claim:

1. A machine for helically winding reinforcing elements around a longitudinally moving elongated article comprising a plurality of spools for the elements, means supporting and moving said spools in a generally circular path about the article, a hollow stationary casting ring supported axially of said path and adapted to have the article pass therethrough, a hollow annular forming die supported in axial alignment with and for rotation relative to said casting ring, and means to guide the elements in individual spaced relationship from the spools to the space between the casting ring and die, the said ring and die having adjacent cooperating surfaces positioned to bend the elements as they pass therebetween and the said die rotating with the elements as they are moved in said path so that the elements are helically wrapped about the article.

2. A machine for producing a reinforced hose having a liner wrapped with reinforcing elements, the said machine comprising a plurality of spools for the reinforcing elements, means supporting said spools for movement in a generally circular path, means to move the spools in said path, a hollow stationary casting ring supported axially of said path, a hollow forming die supported in axial alignment with and for rotation relative to said casting ring, said casting ring and forming die being adapted to have a hose liner moved longitudinally therethrough with the reinforcing elements extending between the ring and die and about said liner, and means rotatable with said die to guide reinforcing elements in individual spaced relationship in their passage from said spools to said casting ring, whereby longitudinal movement of the said liner and movement of said spools in said path cause the reinforcing elements to be helically wrapped in evenly spaced relationship around said liner.

3. A machine for producing a reinforced hose having a liner wrapped with reinforcing elements, the said machine comprising a support with a central opening, a plurality of spools for hose reinforcing elements mounted on said support for rotation thereabout in a predetermined generally circular path, means to move the spools in the said path, a hollow stationary casting ring supported upon said spool support concentrically with the opening in the latter, a hollow forming die supported in axial alignment with and for rotation relative to said casting ring; said spool support, casting ring and forming die being adapted to have a hose liner moved longitudinally therethrough with the reinforcing elements extending between the ring and die and about said liner; and means rotatable with said die to guide the reinforcing elements in individual spaced relationship in their passage from said spools to said casting ring; whereby longitudinal movement of the said liner and movement of said spools in said path cause the reinforcing elements to be helically wrapped in evenly spaced relationship around said liner.

4. A machine for producing a reinforced hose having a liner wrapped with reinforcing elements, the said machine comprising a support with a central opening, a plurality of spools for hose reinforcing elements mounted on said support for rotation thereabout in a predetermined generally circular path, means to move the spools in said path, a hollow stationary casting ring supported concentrically with the opening in said spool support, a hollow forming die, means supporting said die in axial alignment with and for rotation relative to said casting ring with the said supporting means including means to adjust the axial spacing between the said ring and die, said casting ring and forming die being adapted to have a hose liner moved longitudinally therethrough with the reinforcing elements extending between the ring and die and about said liner, and means rotatable with said die to guide reinforcing elements in individual spaced relationship in their passage from said spools to said casting ring, whereby longitudinal movement of the said liner and movement of said spools in said path cause the reinforcing elements to be helically wrapped in evenly spaced relationship around said liner.

5. A machine as defined in claim 4 wherein the said forming die is annular with a convex surface which cooperates with the casting ring to bend the reinforcing elements as they pass between the ring and die in a manner which facilitates helical wrapping of the elements around the liner.

6. A machine for producing reinforced hose having a liner wrapped with reinforcing elements, the said machine comprising a plurality of spools for the reinforcing elements, means supporting said spools for movement in a predetermined generally circular path, means to move the spools in said path, a tubular member the outer end portion of which comprises a casting ring, means supporting said member axially of said path, an annular forming die, means rotatably supporting said die in axial alignment with said tubular member, an annular guide member between said spools and the opening between said ring and die, the said guide member being provided with individual guide surfaces for each reinforcing element, and means supporting said guide member for rotation with said die member, whereby the reinforcing elements from said spools are wrapped in evenly spaced helical configuration around a hose liner passed through said tubular member and die.

7. A machine as defined in claim 6 wherein the said means supporting the die includes means to adjust the die axially relative to the said casting ring.

8. A machine as defined in claim 7 wherein the said die has a convex surface cooperating with the adjacent surface of the casting ring to bend the reinforcing elements as they pass between the ring and die in a manner which facilitates helical wrapping of the elements around the hose liner.

9. In a machine for disposing reinforcement elements about a longitudinally moving elongated article wherein the machine includes a stationary ring, a plurality of spools of reinforcement elements, and a means to support and move said spools about the article in a generally circular path, an attachment for causing the elements from said spools to be disposed in helical configuration about said article comprising a tubular member the outer end portion of which comprises a casting ring, means supporting said member axially of the first-mentioned ring, an annular forming die, means rotatably supporting said die in axial alignment with said tubular member, the said tubular member and die being adapted to have the article move therethrough, an annular guide member between said spools and the opening between said tubular member and die, the said guide member being provided with surfaces for individually guiding each element to the space between said tubular member and die, and means supporting said guide member for rotation with said die, whereby longitudinal movement of the article and movement of the spools in said path cause the elements from said spools to be wrapped in evenly spaced helical configuration around the article.

10. In a machine for disposing wire reinforcements about a longitudinally moving elongated article wherein the machine includes a stationary ring, a plurality of spools of wire, and a means to support and move said spools about the article in a generally circular path, an attachment for causing the wire from said spools to be disposed in helical configuration about said article comprising a tubular member of smaller diameter than the said ring with the outer end of said member comprising a casting ring, means supporting said tubular member upon and axially of the first-mentioned ring, an annular forming die, means rotatably supporting said die in axial alignment with said tubular member, the said tubular member and die being adapted to have the article move longitudinally therethrough, an annular guide member between the first ring and casting ring, the said guide member being radially slotted to provide individual surfaces for guiding each wire to the space between the tubular member and die, and means supporting said guide member for rotation with said die member, whereby longitudinal movement of the article and movement of the spools in said path causes the wire from said spools to be wrapped in evenly spaced helical configuration around the article.

11. An apparatus for winding reinforcing elements around a longitudinally moving elongated article comprising a tubular member through which the article is moved, an annular casting ring at one end of said member, an annular forming die having a convexly curved surface, annular anti-friction bearing means mounted on said tubular member, a plurality of supporting members carried by said bearing means for rotation relative to said tubular member, the said supporting members including portions extending generally axially relative to said tubular member and beyond that end of the latter provided with said casting ring, means carried by said supporting members engaging said die thereby supporting the latter in axial alignment with said tubular member, the last-mentioned means including means permitting axial adjustment of the said die relative to the casting ring, a plurality of reinforcing element supplying spools, means for supporting and moving said spools in a circular path coaxial with said tubular member, and an annular guide member mounted on said supporting members for rotation therewith adjacent the space between said casting ring and die, the said guide member having a plurality of guide surfaces for receiving elements from said spools and guiding them into the space between the casting ring and die, the said guide member and die being rotated by the travel of the elements about said tubular member thereby helically winding the elements about the article moving through the tubular member and die.

12. An attachment for converting a machine for braiding reinforcing elements about a longitudinally moving elongated article to a helical winding of the reinforcing elements about the article, the said attachment comprising a tubular member adapted to be supported coaxially of the braiding machine for passage therethrough of the article to be provided with a winding, an annular die, means carried by said tubular member rotatably supporting said die in axial alignment with said tubular member adjacent one end of the latter in a position such that reinforcing elements to be wound around an article passing through the tubular member and die are bent in a manner facilitating helical winding of the elements on the article, and a guide member for the reinforcing elements supported for rotation with said die adjacent the space between the latter and the adjacent end of the tubular member.

13. The combination as defined in claim 12 and further comprising means to adjust the spacing between said die and tubular member.

14. The combination as defined in claim 12 wherein the face of the said die adjacent said tubular member has a convex curvature.

15. A machine for providing helical windings of reinforcing elements about a longitudinally moving elongated article comprising two tubular members, means supporting said members in spaced axial alignment for sequential passage therethrough of the article to be wound, two annular casting dies adapted to have the article passed sequentially therethrough, separate means rotatably supporting the said dies respectfully from said tubular members in axial alignment therewith and with each die disposed adjacent the end of its supporting tubular member so that reinforcing elements passing through the space therebetween is bent in a manner facilitating wrapping around the article as it passes through said dies, a plurality of reinforcing element supply spools supported in two sets for motion in a generally circular path about said tubular members with one of said sets located adjacent each of said tubular members respectively and supplying reinforcing elements from the spools of that set to the space between the adjacent tubular member and die, a separate guide member supported on each of said tubular members for rotation with the associated die member, each of said guide members having surfaces for receiving and guiding individual elements from the spools of the adjacent set thereof, and means to move all of the spools of one of said sets in one direction in their circular path and the spools of the other set in the reverse direction, whereby an article longitudinally moving through the machine is sequentially provided with two layers of helically wound reinforcing elements with the convolutions of one layer wound in the reverse direction to the convolutions of the other layer.

16. A hose making machine comprising at least three braiding heads and associated braiding rings with each head normally including mechanism for moving alternate reinforcing element supplying spools of that head in reverse generally circular directions about a mandrel to thereby braid the elements about a hose liner supported on the mandrel, at least two of said heads having alternate spools removed so that the remaining spools of each of the said two heads are moved in a single direction with the said remaining spools of one of the said two heads moving in the direction opposite to that of the remaining spools of the other of the said two heads, a tubular member for each of said two heads adapted to have the liner supporting mandrel pass therethrough, means stationarily supporting said tubular members coaxially of the braiding rings and circular paths of said spools with a tubular member adjacent each braiding ring of the said two heads, an annular forming die for each of said two heads adapted to have the liner supporting mandrel pass therethrough, means rotatably supporting each die in axial alignment with one of said tubular members and adjacent an end thereof to provide a space therebetween through which reinforcing elements from said spools are passed in their path to the liner on the mandrel and are bent to form in helical convolutions about said liner, and a separate annular guide means for the elements of each of said two heads, the said guide means being rotatable with said dies and disposed to engage the reinforcing elements prior to their entrance into the spaces between the tubular members and dies, the said dies and guide means being rotated by the force exerted on the said guide means by the reinforcing elements as the spools are moved in their generally circular paths.

17. In a machine for winding reinforcement elements about a longitudinally moving elongated article and including at least three spaced axially aligned units each comprising a plurality of spools of reinforcing elements disposed in a generally circular configuration and a stationary braiding ring spaced axially from the spools and coaxially relative thereto, at least two of said units each including an attachment for causing the reinforcing elements from said spools to be disposed in a helical configuration about said article comprising a tubular member adapted to have the article pass therethrough, means supporting the tubular member on a braiding ring coaxially therewith, the outer end portion of said tubular member comprising a casting ring, an annular forming die adapted to have the article pass therethrough, means rotatably supporting said die in axial alignment with said tubular member with a space between said casting ring and die, an annular reinforcing element guide member between said spools and the said opening between the second casting ring and die, the said guide member being provided with guide surfaces for individual reinforcing elements, means supporting said guide member for rotation with said die member, means for rotating all the said spools of one of said two units about the tubular member of that unit in one direction and all the said spools of the other of said two units in the reverse direction so that the elements from the spools of said two units are wrapped in two superposed evenly spaced helical configurations in two layers around the longitudinally moving article with the convolutions of the one helix reversed relative to the convolutions of the other helix, and at least one of the remaining units of said machine comprising means to move alternate spools of the last-named unit in opposite directions to thereby provide a braiding operation of the wires over the mandrel supported article.

18. A machine as defined in claim 17 and further comprising a single means for moving the spools of all of said units.

References Cited in the file of this patent
UNITED STATES PATENTS 2,048,893    Rogers _____ July 28, 1936